United States Patent
Ozeki et al.

(12)

(10) Patent No.: US 6,498,633 B1
(45) Date of Patent: Dec. 24, 2002

(54) COLOR LIQUID CRYSTAL DISPLAY DEVICE WHEREIN THE COLOR POLARIZER HAVING WAVELENGTH DEPENDENCE OF THE POLARIZING EFFICIENCY

(75) Inventors: Masao Ozeki, Kanagawa (JP); Seiji Kojima, Kanagawa (JP)

(73) Assignee: Optrex Corporation, Tokyo (JP)

( * ) Notice: Subject to any disclaimer, the term of this patent is extended or adjusted under 35 U.S.C. 154(b) by 0 days.

(21) Appl. No.: 09/559,082

(22) Filed: Apr. 27, 2000

(30) Foreign Application Priority Data

Apr. 28, 1999 (JP) .............................. 11-121034

(51) Int. Cl.$^7$ ............................ G02F 1/1335
(52) U.S. Cl. ................ 349/96; 349/102; 349/108; 349/113
(58) Field of Search ................ 349/96, 102, 117, 349/121, 108, 119, 114, 113

(56) References Cited

U.S. PATENT DOCUMENTS

| | | | | |
|---|---|---|---|---|
| 4,759,612 A | * | 7/1988 | Nakatsuka et al. | 350/337 |
| 5,124,824 A | * | 6/1992 | Kozaki et al. | 359/73 |
| 5,321,536 A | * | 6/1994 | Ishii et al. | 359/72 |
| 5,923,392 A | * | 7/1999 | Akatsuka et al. | 349/118 |
| 6,181,309 B1 | * | 1/2001 | Mori et al. | 345/88 |

* cited by examiner

*Primary Examiner*—Toan Ton
*Assistant Examiner*—Mike Qi
(74) *Attorney, Agent, or Firm*—Oblon, Spivak, McClelland, Maier & Neustadt, P.C.

(57) ABSTRACT

A color liquid crystal display device capable of displaying uniformly four colors of white, red, blue and green with high purity by multiplex driving is provided. In a system for effecting a multi-color display using a same display unit and utilizing retardation, at least one color polarizer is used between a pair of polarizers, which indicates a specified range wherein the polarizing efficiency of red or blue is relatively lower than that of green.

5 Claims, 4 Drawing Sheets

COLOR LIQUID CRYSTAL DISPLAY DEVICE WHEREIN THE COLOR POLARIZER HAVING WAVELENGTH DEPENDENCE OF THE POLARIZING EFFICIENCY

BACKGROUND OF THE INVENTION

1. Field of the Invention

The present invention relates to a color liquid crystal display device capable of displaying uniformly four colors of white, red, blue and green in a state of highly purified color development by multiplex driving.

2. Background Art

JP-A-2-118516 (conventional example 1) discloses that it is possible to obtain a large variation of colors by changing a voltage applied to a liquid crystal cell containing twisted liquid crystal. However, the disclosed technique has a problem that color development is limited to only yellow, red, purple, violet, blue and green, and a white display is impossible.

Further, the conventional example 1 discloses a two-layered structure using a compensation cell whereby a monochrome display is possible. However, it has a problem that it is impossible to display uniformly white or black or a color such as blue, green or the like on a picture surface.

JP-A-2-183220 (conventional example 2) discloses that pixels are formed even in the compensation cell to effect a display wherein white or black and colors of blue, green and so on can uniformly be displayed. In this technique, however, there are problems that pixels in the two-layered liquid crystal panels must be formed in a one-to-one corresponding relation, which makes the manufacture very difficult, and when a picture displayed on the layered liquid crystal panels is observed from an oblique direction, parallax appears whereby complete overlapping of colors can not be expected. Further, there is a further problem of increasing the weight of the device.

JP-A-8-292434 (conventional example 3) describes that an achromatic color can be displayed by using a retardation plate as well as being capable of developing blue, red and green. In this technique, however, a color development of red subsequent to white obtained by applying a voltage is orange red, and it is impossible to develop a color of red having a high color purity.

Although the conventional example 3 describes the way of developing a color of pink red where visibility to red is high, this technique requires an increase of $\Delta n_L d_L$ of liquid crystal to enhance a change of condition of liquid crystal so that pink red is developed. In order to display uniformly pink red and white by multiplex driving, it was necessary to render $\Delta n_L d_L$ of a liquid crystal layer to be 1.7 or more. However, there was a limit in increasing $\Delta n_L d_L$ of the liquid crystal layer by increasing $\Delta n_L$. Further, it was necessary to increase $d_L$. Accordingly, there were problems that the response speed of liquid crystal was low; view angle dependence became large; the structure became weak due to an increase of the cell gap, and temperature dependence became large. Therefore, the conventional example 3 is not practical.

Thus, the conventional example 3 could not provide white of high purity and red where visibility to red is high even by adjusting practical $\Delta n_L d_L$ of a liquid crystal layer.

JP-A-9-33917 (conventional example 4) discloses that when a liquid crystal layer having $\Delta n_L d_L$ of 1.533 μm is driven by a static driving system and a polarizer colored with a blue series color is used, a display of red color composed of a pink series orange is obtainable as well as a display of four colors of an achromatic color, red, green and blue, and in addition, when a polarizer colored with a purple series color is used, red is strong.

Even in this method, however, it is impossible to display of red, white, blue and green each having high purity by multiplex driving.

SUMMARY OF THE INVENTION

It is an object of the present invention to provide a color liquid crystal display device capable of displaying uniformly four colors of white, red, blue and green with high purity by multiplex driving.

In accordance in a first aspect of the present invention, there is provided a color liquid crystal display device capable of developing colors of white, red, blue and green with a same display unit, which comprises:

a liquid crystal layer held between two substrates arranged substantially in parallel to each other, each provided with a transparent electrode and an aligning layer wherein the liquid crystal layer is composed of a nematic liquid crystal; the twist angle of the liquid crystal layer, according to the alignment direction of liquid crystal molecules, determined by the alignment layers on the substrates is 160–300° and the product $\Delta n_L d_L$ of the refractive anisotropy $\Delta n_L$ of the liquid crystal in the liquid crystal layer and the thickness $d_L$ of the liquid crystal layer is 1.0–1.5 μm, a pair of polarizers disposed outside the liquid crystal layer wherein at least one of the pair of polarizers is a color polarizer; and the wavelength dependence of the polarizing efficiency of the color polarizer is 0.1–0.7 in terms of (the polarizing efficiency of a wavelength of 650 nm)/(the polarizing efficiency of a wavelength of 450 nm), 0–0.6 in terms of (the polarizing efficiency of a wavelength of 650 nm)/(the polarizing efficiency of a wavelength of 550 nm) and 0.4–1.0 in terms of (the polarizing efficiency of a wavelength of 450 nm)/(the polarizing efficiency of a wavelength of 550 nm); and a driving circuit for applying a driving voltage across the transparent electrodes, which conducts multiplex driving to enable the selection of at least four different voltage values.

According to a second aspect of the present invention, there is provided the color liquid crystal display device according to the first aspect wherein the wavelength dependence of the polarizing efficiency of the color polarizer is 0.2–0.6 in terms of (the polarizing efficiency of a wavelength of 650 nm)/(the polarizing efficiency of a wavelength of 450 nm), 0.1–0.6 in terms of (the polarizing efficiency of a wavelength of 650 nm)/(the polarizing efficiency of a wavelength of 550 nm) and 0.5–1.0 in terms of (the polarizing efficiency of a wavelength of 450 nm)/(the polarizing efficiency of a wavelength of 550 nm).

According to a third aspect of the present invention, there is provided the color liquid crystal display device according to the first aspect or the second aspect, wherein the angle θ2 formed between the direction of stretching axis of a retardation plate and the orientation direction of liquid crystal molecules at the side of the substrate on which the retardation plate is disposed is 80–100°; the angle θ1 formed between the absorbing axis of the polarizer adjacent to the retardation plate and said orientation direction is 130–150° and the angel θ3 formed between the direction of absorbing axis of the polarizer at the side of the other substrate and the orientation direction of liquid crystal molecules at the side of the other substrate is 125–145°.

According to a fourth aspect of the present invention, there is provided the color liquid crystal display device according to any one of the first to third aspects, wherein a reflection plate or a transflector is disposed at an outer side of the other polarizer between the pair of polarizers.

Further, according to a fifth aspect of the present invention, there is provided the color liquid crystal display device according to any one of the first to fourth aspects, wherein $\Delta n_L$ of the liquid crystal is at least 0.18.

BRIEF DESCRIPTION OF DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF PREFERRED EMBODIMENTS

In the present invention, it is important to use a color polarizer which has the wavelength dependence of the polarizing efficiency specified as described above and which satisfies a specific range in which the polarizing efficiency of red (650 nm) and blue (450 nm) is lower than the polarizing efficiency of green (550 nm).

When a polarizer having a high polarizing efficiency (e.g., SK-1842AP manufactured by Sumitomo Chemical CO., Ltd) is used for the entire region of the wavelength of visible light (in particular, 400–700 nm), it is very difficult to effect the color development of white as well as red and blue having high purity wherein the later case is obtainable by changing the condition of liquid crystal. It is because the phase of the visible light has to be substantially uniform over the entire wavelength region in order to develop a white color. Further, even though the condition of the liquid crystal is changed by using the visible light having uniform phase by changing a voltage, it is impossible to increase a change of phase difference between each wavelength. Accordingly, the color development of red having high purity is not obtainable although the color development of an orange color as a color near to red is obtainable.

On the other hand, when the balance between $\Delta n_L d_L$ of the liquid crystal layer and a retardation value of the retardation plate, and the arrangement of the retardation plate and the polarizer are adjusted to develop a red color having high purity, it is unavoidable that the purity of white decreases and a green tone is mixed in white.

In view of this, if a generally known purple series color polarizer is used in the above-mentioned wavelength region of green, a green tone in white can be suppressed and a pure white color is obtainable. Further, the orange color can be changed to red while a blue color can be maintained, whereby three colors of white, red and blue can be developed with high purity in a same display unit.

However, in the generally known purple series color polarizer, each polarizing efficiency of blue and red is low, and when a green color is developed, a red light and a blue light transmit through the polarizer. Accordingly, the color development of green can not be obtained. Therefore, it is important to control each polarizing efficiency of blue and red.

Specifically, the wavelength dependence of the polarizing efficiency of the color polarizer should be 0.1–0.7 in terms of (the polarizing efficiency of a wavelength of 650 nm)/(the polarizing efficiency of a wavelength of 450 nm), 0–0.6 in terms of (the polarizing efficiency of a wavelength of 650 nm)/(the polarizing efficiency of a wavelength of 550 nm) and 0.4–1.0 in terms of (the polarizing efficiency of a wavelength of 450 nm)/(the polarizing efficiency of a wavelength of 550 nm).

Further, it is preferable that the wavelength dependence of the polarizing efficiency of the color polarizer is 0.2–0.6 in terms of (the polarizing efficiency of a wavelength of 650 nm)/(the polarizing efficiency of a wavelength of 450 nm), 0.1–0.6 in terms of (the polarizing efficiency of a wavelength of 650 nm)/(the polarizing efficiency of a wavelength of 550 nm), and 0.5–1.0 in terms of (the polarizing efficiency of a wavelength of 450 nm)/(the polarizing efficiency of a wavelength of 550 nm).

When the above-mentioned ranges in the ratios of the polarizing efficiency are satisfied, a display of white, red and blue as well as green can be obtained.

It is desirable to use a single color polarizer so that the wavelength dependence of the polarizing efficiency is within the above-mentioned ranges. However, a plurality of color polarizers may be used to obtain a desired wavelength dependence wherein absorbing axis of the polarizers should be made coincident with each other.

The definition of the polarizing efficiency of the polarizers is described. The polarizing efficiency is expressed by (Px−Py)/(Px−Py) where Px represents a transmittance in a direction of transmitting axis and Py represents a transmittance in a direction of absorbing axis of the polarizers. Further, when a transmittance in an orthogonal arrangement of two polarizers is expressed by T⊥ and a transmittance in a parallel arrangement of the two polarizers is expressed by T∥, T⊥ and T∥ are expressed by:

$T\perp = Px \times Py$ $T\| = (Px^2 + Py^2)/2$

Accordingly, the polarizing efficiency can be expressed by $\{(T\|-T\perp)/(T\|+T\perp)\}^{1/2}$.

Figure 7:
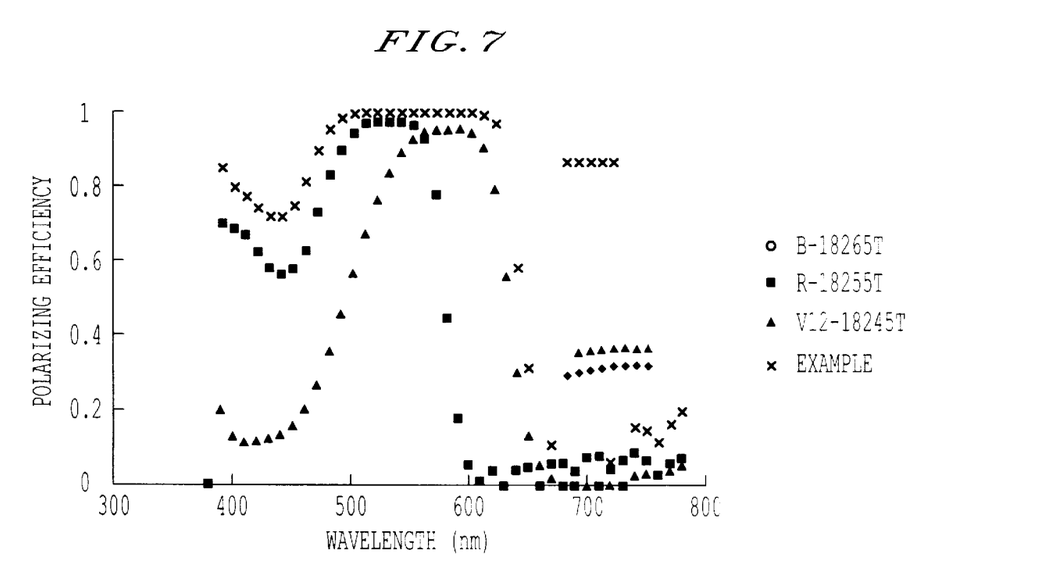
FIG. 7 is a diagram showing the wavelength dependence of the polarizing efficiency of the color polarizer used for the present invention and the wavelength dependence of the polarizing efficiency of generally known blue series, red series and purple series color polarizers.

FIG. 7 shows the wavelength dependence of the polarizing efficiency of color polarizers used in Example wherein a blue series color polarizer (B-18255T by POLATECHNO), a red series color polarizer (R-18255T by POLATECHNO) and a purple series color polarizer (V12-18254T by POLATECHNO) which are generally known, and a color polarizer used for Example, are shown. Table 1 indicates digital data.

From FIG. 7, it is understood that the wavelength dependence of the polarizing efficiency of the color polarizer used in this example is different from those of the conventionally used color polarizers.

TABLE 1

| Polarizer | Polarizing efficiency at each wavelength | | | Ratio of polarizing efficiency | | |
|---|---|---|---|---|---|---|
| | 450 nm | 550 nm | 650 nm | 650/450 | 650/550 | 450/550 |
| B-18255T | 0.141 | 0.560 | 0.893 | 6.33 | 1.59 | 0.252 |
| R-18255T | 0.575 | 0.970 | 0.0511 | 0.0986 | 0.0527 | 0.593 |
| V12-18245T | 0.158 | 0.934 | 0.135 | 0.859 | 0.145 | 0.169 |
| Example | 0.750 | 0.999 | 0.313 | 0.417 | 0.313 | 0.750 |

In the present invention, the product $\Delta n_L d_L$ of the refractive anisotropy $\Delta n_L$ of liquid crystal in the liquid crystal layer and the thickness $d_L$ of the liquid crystal layer is 1.0–1.5 μm, preferably, 1.1–1.4 μm. When the value is too large, the problem due to an increase of $d_L$ as described with respect to the conventional example 3 occurs. On the other hand, when the value is too small, a sufficient color development can not be expected.

With respect to $\Delta n_L$, liquid crystal having 0.18 or more, especially, 0.19 or more is preferably used so that $d_L$ is not made excessively large.

A liquid crystal display device for outdoor use or to be mounted on a vehicle is required to develop desired colors even under a high temperature condition. In this case, liquid crystal having a nematic isotropic transition temperature Tn1 of 105° C. or more, preferably, 110° C. or more should be used.

The retardation value of the retardation plate should be larger than $\Delta n_L d_L$ of the liquid crystal layer, i.e., in a range of 1.1–1.6 nm.

Figure 2:
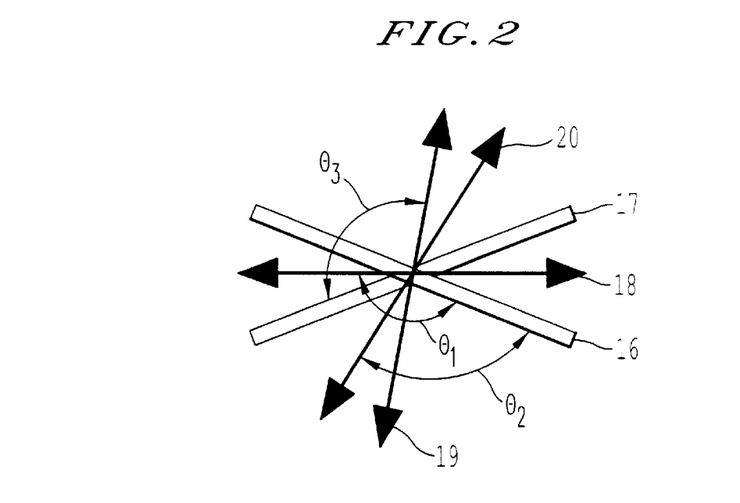
FIG. 2 is a plain view showing relative positions of the orientation direction of liquid crystal molecules in the liquid crystal layer, the direction of absorbing axis of a polarizer and the direction of stretching axis of a retardation plate, which is viewed from an upper part of the liquid crystal display device of the first embodiment of the present invention.

FIG. 2 shows an angular arrangement of a retardation plate and polarizers. In FIG. 2, the angle θ2 formed between the direction of stretching axis of a retardation plate and an orientation direction of liquid crystal molecules at the side of the substrate adjacent to the retardation plate is 80–100°, the angle θ1 formed between the direction of absorbing axis of the polarizer adjacent to the retardation plate and said orientation direction is 130–150°, and the angle θ3 formed between the direction of absorbing axis of the polarizer adjacent to the other substrate and the orientation direction of liquid crystal molecules at the side of the other substrate is 125–145°. With such angular arrangement, the greatest change of color development is obtainable.

In the description of the present invention, a liquid crystal layer having a left-hand helical structure is used. However, even when a liquid crystal layer having the reverse helical structure is used, the relation of angle θ1, θ2 or θ3 among the orientation direction of liquid crystal molecules in the liquid crystal layer, the direction of absorbing axis of the polarizers and the direction of stretching axis of the retardation plate should be considered counterclockwise.

In an embodiment of the color liquid crystal display device of the present invention, the order of color development is white, red, blue and green in view from a lower voltage side.

The term of "the same display unit" used in this text means a single segment with a pair of opposing electrodes in a segment display portion, and a single dot with a pair of opposing electrodes in a dot matrix display portion.

In a preferred embodiment of the present invention, it is preferable to minimize the spacing between adjacent display units, e.g., to form a gap of 15 μm or less, preferably, 10 μm or less, from the viewpoint of controlling the reduction of contrast due to the mixing of a background color and the reduction of color purity.

With respect to the driving system for the color liquid crystal display device of the present invention, a multiplex driving system is utilizable because it is effective to a display having a large number of pixels. Further, although a known system is used as a control system for a display providing gray shades, a pulse width modulation system (PWM) or a combination of the pulse width modulation system and a frame modulation system is preferably utilized from the viewpoint of flexibility in determining gray shades.

Now, the present invention will be described in detail with reference to examples. However, it should be understood that the present invention is by no means restricted by such specific examples.

EXAMPLE

An example of the color liquid crystal display device according to the present invention will be described in detail with reference to the drawings.

Figure 1:
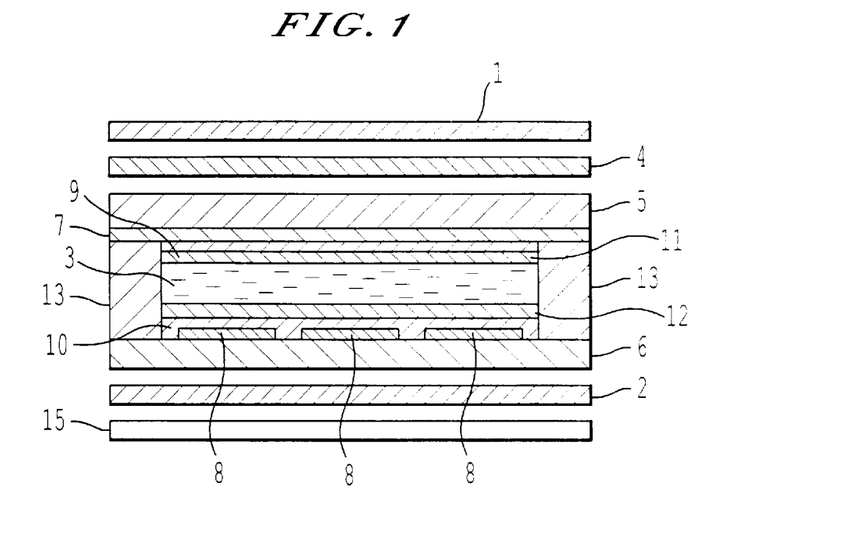
FIG. 1 a diagrammatical view in cross section for explaining the structure of color liquid crystal display device of a first embodiment of the present invention.

FIG. 1 is a diagrammatical cross-sectional view showing a basic structure of the color liquid crystal display device of an embodiment of the present invention wherein reference numerals 1, 2 designate a pair of polarizers, numeral 3 designates a liquid crystal layer, numeral 4 a retardation plate and numeral 15 a backlight.

A liquid crystal cell was prepared as follows.

Each ITO transparent conductive layer was formed on each glass substrate. The conductive layers were patterned in a stripe form to thereby form a transparent electrodes 7 and 8. An insulating film 9 or 10 was formed on the electrode 7 or 8 and an overcoat layer of polyimide was formed on the insulating film 9 or 10, followed by rubbing it to form an alignment controlling layer or an aligning layer 11 or 12. Thus, a substrate 5 or 6 was prepared. Two substrates 5, 6 thus prepared were overlaid with a gap therebetween, and a sealing material 13 was applied to the periphery of the overlaid substrates to form a liquid crystal cell. A nematic liquid crystal was filled in the liquid crystal cell, and an injection hole was closed with the sealing material.

By adjusting the cell gap, the thickness $d_L$ of the liquid crystal layer was determined to be 6.5 μm. Liquid crystal used was such that $\Delta n_L$ was 0.195 and nematic-isotropic transition temperature $T_{n1}$ was 115° C. with the result that $\Delta n_L d_L$ of the liquid crystal layer was about 1.27 μm.

The twist angle of the liquid crystal layer was 240° and the retardation value of the retardation plate was 1.40 μm (in the measurement with a wavelength of 590 nm).

A color polarizer was used for a front side polarizer 1 and an ordinary polarizer (SK-1842AP manufactured by Sumitomo Chemical Co., Ltd) was used for a rear side polarizer 2.

Figure 3:
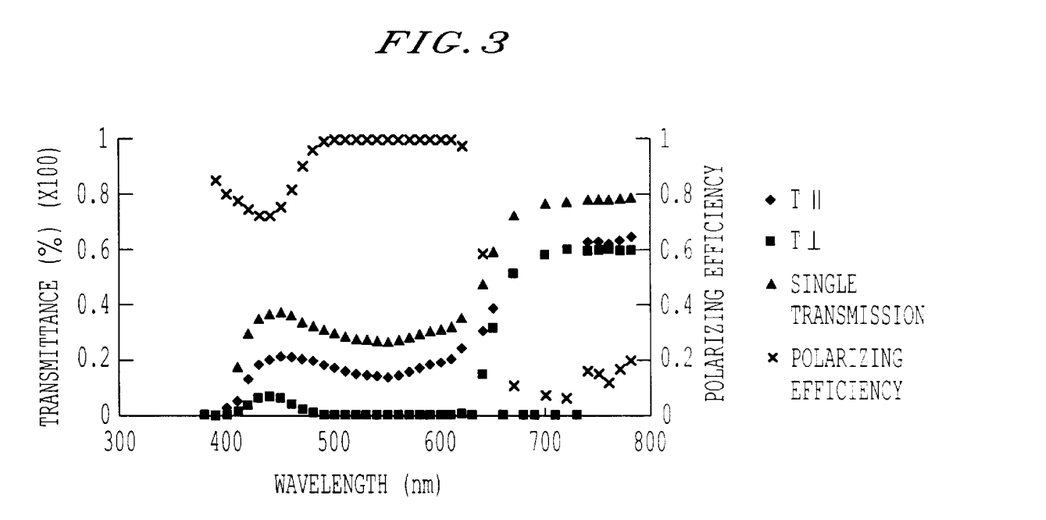
FIG. 3 is a diagram showing the polarizing efficiency and the angle transmittance of the color polarizer, and spectral transmittances in an orthogonal arrangement and a parallel arrangement of a color polarizer used for the first embodiment of the present invention.

The spectral transmittance characteristics of the color polarizers in an overlapping state were 5.9% with 450 nm, 0.1% with 500 nm, 0% with 550 nm, 0% with 600 nm, 32% with 650 nm and 58% with 700 nm, each in an orthogonal arrangement, and 21% with 450 nm, 17% with 500 nm, 14% with 550 nm, 19% with 600 nm, 39% with 650 nm and 59% with 700 nm, each in a parallel arrangement. The polarizing efficiency was 0.75 with 450 nm, 1.0 with 500 nm, 1.0 with 550 nm, 1.0 with 600 nm, 0.313 with 650 nm and 0.28 with 700 nm. Namely, the ratio of the polarizing efficiency was 0.417 in terms of (650 nm/450 nm), 0.313 in terms of (650 nm/550 nm) and 0.750 in terms of (450 nm/550 nm). The characteristics of the color polarizer is shown in FIG. 3.

FIG. 2 shows the orientation directions of liquid crystal molecules, the directions of absorbing axis of the polarizers and the direction of stretching axis of the retardation plate used in this example. These directions were determined such that the angle θ1 formed between the absorbing axis 18 of a polarizer 1 adjacent to a retardation plate 4 and the orientation direction 16 of the liquid crystal molecules at the side of the substrate 5 where the retardation plate 4 was disposed was 141°, the angle $\theta_2$ formed between the direction 20 of stretching axis of the retardation plate 4 and the orientation direction 16 of the liquid crystal molecules was 89°, and the angle $\theta_3$ formed between the direction 19 of absorbing axis of a polarizer 2 at the side of the other substrate 6 and the orientation direction 17 of liquid crystal molecules at the side of the other substrate 6 was 140°.

Figure 5:
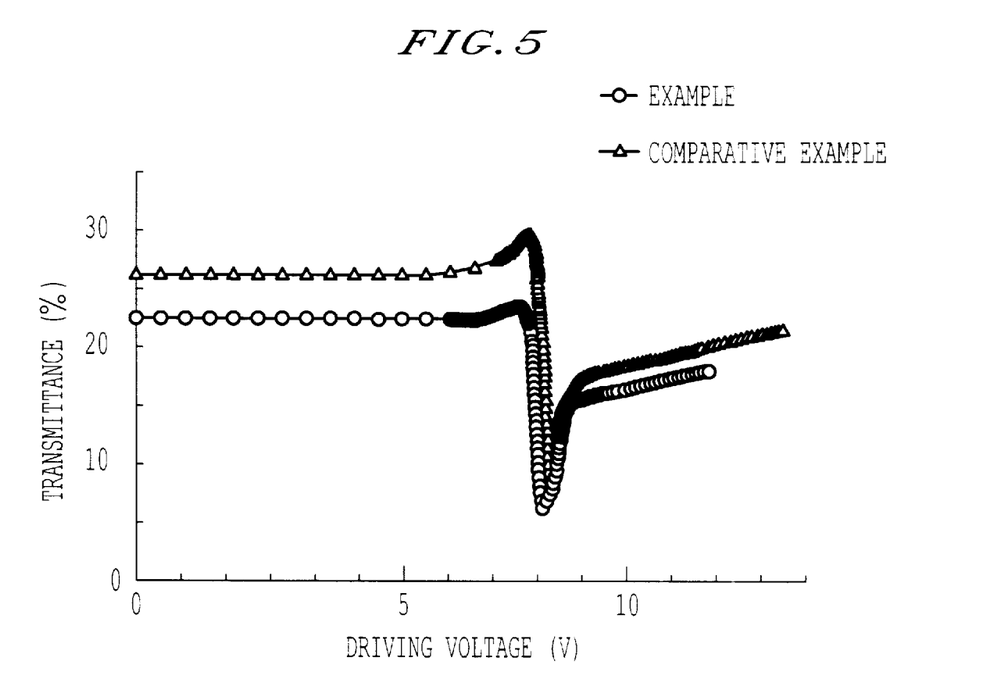
FIG. 5 is a diagram showing a voltage-transmittance curve in an example of the present invention and a voltage-transmittance curve in comparative example.
Figure 6:
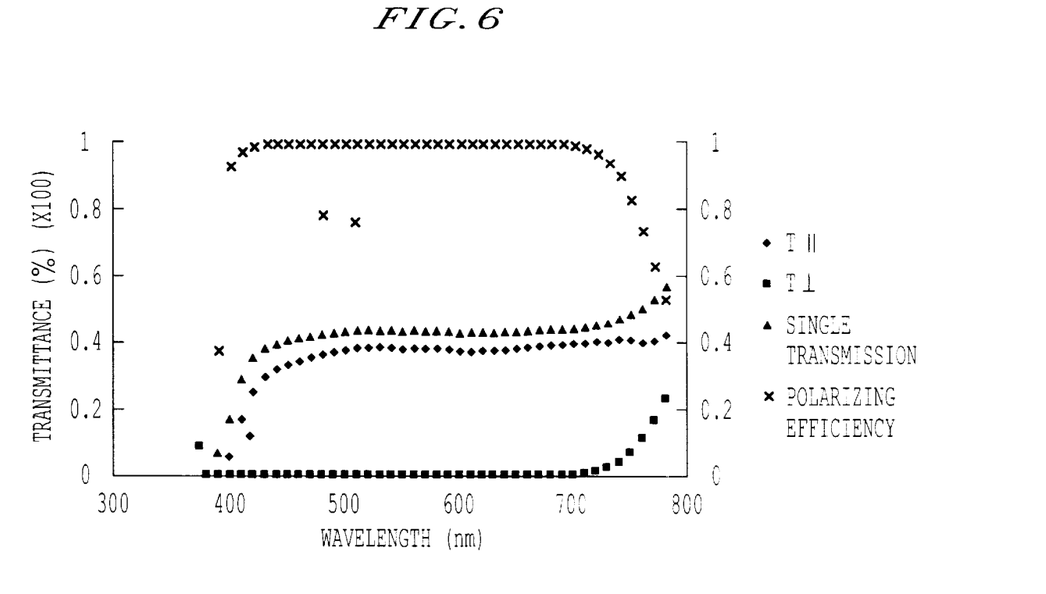
FIG. 6 is a diagram showing the polarizing efficiency and the single transmittance and spectral transmittances in an orthogonal arrangement and a parallel arrangement, of an ordinary used polarizer used for comparative example.

To the color liquid crystal display device thus obtained, multiplex driving was conducted with 1/65 duty and ⅛ bias. FIG. 5 shows a relation of voltage vs transmittance in the multiplex driving. For a controller driver, IC (T6K03) manufactured by Toshiba was used. For gray shade levels, an OFF waveform was applied to obtain a white display, an ON waveform was applied to obtain a green display, and intermediate voltage levels between the ON and OFF voltage levels were applied to obtain a red display or a blue display. The intermediate voltage levels were prepared in combination of a pulse width modulation and a frame modulation.

Figure 4:
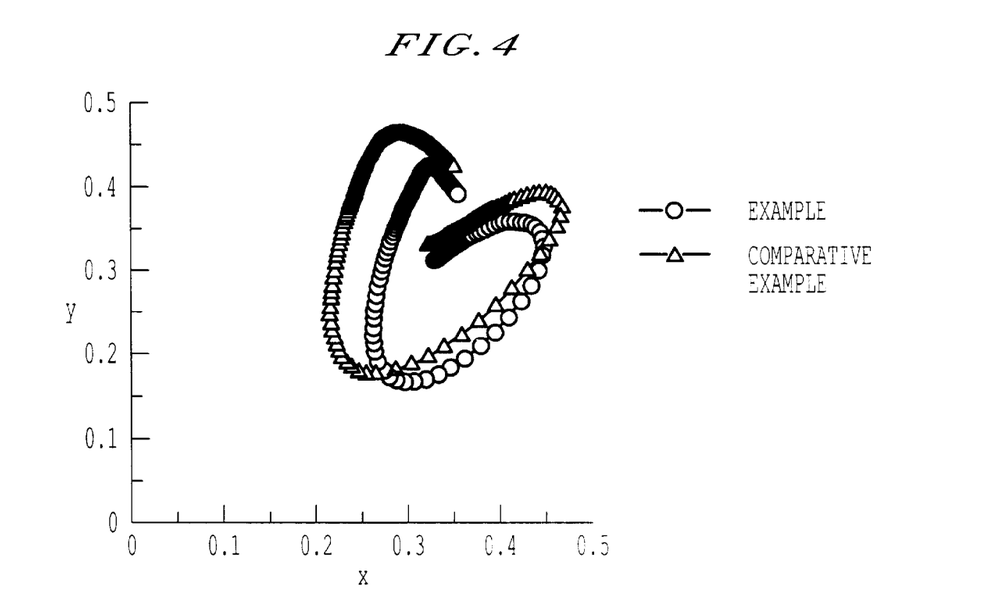
FIG. 4 is a chromaticity diagram showing a color variation in an example of the present invention and a color variation in comparative example.

The variation of color development is shown as a chromaticity diagram in FIG. 4. The measurement was conducted in a transmissive mode. In this case, the aperture ratio of the panel was 86%.

The variation of colors in a case that an ordinary polarizer has been used instead of the color polarizer is also shown for comparison in FIG. 4. It is understood that the color development of white shifts to a green side and the color development of red is weak. Thus, it is understood that use of the color polarizer contributes to an improvement of color development.

The same effect as described above could be obtained even when color polarizers were disposed at a front side and a back side.

Further, when a transflector was disposed between the backlight and the polarizer at a rear side in order to use the liquid crystal display device as a transflective type, a good display was obtained.

Further, a reflective type liquid crystal display device is obtainable by substituting the backlight with a reflector. Further, a film having a light polarizing/separating function such as RDF (tradename) manufactured by Sumitomo 3M may be used as the polarizer disposed at a rear side of the liquid crystal layer.

When a multiple line addressing method was used as the driving method, a frame response was suppressed, and a reduction of color purity, in particular, in a high temperature range could be suppressed.

In the description of the present invention, a single retardation plate of uni-axial anisotropy type is disposed at a front side of the liquid crystal layer. However, it is possible to use a plurality of retardation plates, which may be arranged at both sides. Further, the retardation plate may be a biaxial anisotropy type or a twist type. Various applications can be made based on the description mentioned above as far as the effect of the invention is not reduced.

Further, in this text, the retardation plate is disposed in the vicinity of the color polarizer. However, the retardation plate may be disposed at a position separate from the color polarizer.

According to the present invention, a color liquid crystal display device capable of displaying four colors of white, red, blue and green with high purity in a same display unit by multiplex driving without using a color filter or a compensation cell, can be realized.

Further, a color display device of low power consumption, suitable for carrying and capable of presenting a light display can be provided. In particular, when it is used as a reflective type, a large effect can be expected.

When the color liquid crystal display device of the present invention is used for a portable electronic device such as a portable telephone, an electronic organizer, an electronic book, an electronic dictionary, a PDA (personal digital assistance), or a pager (a pocket bell), which are all for outdoor use, it performs a high function as well as good visibility and expression characteristics.

The present invention can be applied to various purposes of use as far as the effect of the present invention is not reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A color liquid crystal display device capable of developing colors of white, red, blue and green in a same display unit, which comprises:

a liquid crystal layer held between two substrates arranged substantially in parallel to each other, each provided with a transparent electrode and an aligning layer wherein the liquid crystal layer is composed of a nematic liquid crystal; the twist angle of the liquid crystal layer, according to the alignment direction of liquid crystal molecules, determined by the alignment layers on the substrates is 160–300°, and the product $\Delta n_L d_L$ of the refractive anisotropy $\Delta n_L$ of the liquid crystal in the liquid crystal layer and the thickness $d_L$ of the liquid crystal layer is 1.0–1.5 um, a pair of polarizers disposed outside the liquid crystal layer wherein at least one of the pair of polarizers is a color polarizer; and the wavelength dependence of the polarizing efficiency of the color polarizer is 0.1–0.7 in terms of (the polarizing efficiency of a wavelength of 650 nm)/(the polarizing efficiency of a wavelength of 450 nm), 0–0.6 in terms of (the polarizing efficiency of a wavelength of 650 nm)/(the polarizing efficiency of a wavelength of 550 nm) and 0.4–1.0 in terms of (the polarizing efficiency of a wavelength of 450 nm)/(the polarizing efficiency of a wavelength of 550 nm); and a driving circuit for applying a driving voltage across the transparent electrodes, which conducts multiplex driving to enable selection of at least four different voltage values.

2. The color liquid crystal display device according to claim 1, wherein the wavelength dependence of the polarizing efficiency of the color polarizer is 0.2–0.6 in terms of (the polarizing efficiency of a wavelength of 650 nm)/(the polarizing efficiency of a wavelength of 450 nm), 0.1–0.6 in terms of (the polarizing efficiency of a wavelength of 650 nm)/(the polarizing efficiency of a wavelength of 550 nm) and 0.5–1.0 in terms of (the polarizing efficiency of a wavelength of 450 nm)/(the polarizing efficiency of a wavelength of 550 nm).

3. The color liquid crystal display device according to claim 1, wherein the angle $\theta 2$ formed between the direction of stretching axis of a retardation plate and the orientation direction of liquid crystal molecules at the side of the substrate where the retardation plate is disposed is 80–100°; the angle $\theta 1$ formed between the absorbing axis of the polarizer adjacent to the retardation plate and the orientation direction is 130–150° and the angel $\theta 3$ formed between the direction of absorbing axis of the polarizer at the side of the other substrate and the orientation direction of liquid crystal molecules at the side of the other substrate is 125–145°.

4. The color liquid crystal display device according to claim 1, wherein a reflection plate or a transflector is disposed at an outer side of the other polarizer between the pair of polarizers.

5. The color liquid crystal display device according to claim 1, wherein $\Delta n_L$ of the liquid crystal is at least 0.18.

* * * * *

UNITED STATES PATENT AND TRADEMARK OFFICE
CERTIFICATE OF CORRECTION

PATENT NO. : 6,498,633 B1 Page 1 of 1
DATED : December 24, 2002
INVENTOR(S) : Ozeki et al.

It is certified that error appears in the above-identified patent and that said Letters Patent is hereby corrected as shown below:

Title page, Item [54] and Column 1, lines 1-5,
Should read:
-- [54] COLOR LIQUID CRYSTAL DISPLAY DEVICE --

Signed and Sealed this

Twentieth Day of May, 2003

JAMES E. ROGAN
*Director of the United States Patent and Trademark Office*